(12) United States Patent  (10) Patent No.: US 7,641,166 B2
Li  (45) Date of Patent: Jan. 5, 2010

(54) POSITIONING MEMBER OF DEVICE ASSEMBLY

(75) Inventor: Jiunn-Her Li, Tu-Cheng (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 733 days.

(21) Appl. No.: 11/317,272

(22) Filed: Dec. 23, 2005

(65) Prior Publication Data

US 2007/0010129 A1  Jan. 11, 2007

(30) Foreign Application Priority Data

Jul. 8, 2005  (CN)  .................. 2005 1 0035937

(51) Int. Cl.
*F16M 13/00* (2006.01)
(52) U.S. Cl. ................... 248/617; 248/346.01; 248/592
(58) Field of Classification Search ................ 248/617, 248/592, 560, 615, 175, 346.01, 500
See application file for complete search history.

(56) References Cited

U.S. PATENT DOCUMENTS

| 481,695 | A | * | 8/1892 | Glover | ....................... 248/617 |
| 794,270 | A | * | 7/1905 | Zielke | .......................... 5/231 |
| 6,304,224 | B1 | | 10/2001 | Lee | |
| 6,683,952 | B1 | | 1/2004 | Bernardi et al. | |

FOREIGN PATENT DOCUMENTS

CN  2290911 Y  9/1998

* cited by examiner

*Primary Examiner*—Amy J Sterling
(74) *Attorney, Agent, or Firm*—Frank R. Niranjan

(57) ABSTRACT

A device assembly includes a device (20), a supporting member (30), and a positioning member (10). The device includes a bottom wall (21). The supporting member includes a main portion (32) to support the device. The positioning member includes a central portion (12) attached to the main portion of the supporting member, and a pair of positioning arms (14) attached to the bottom wall of the device.

19 Claims, 6 Drawing Sheets

US 7,641,166 B2

POSITIONING MEMBER OF DEVICE ASSEMBLY

BACKGROUND

1. Field of the Invention

The present invention pertains to device assemblies such as those including electronic devices, and particularly to a device assembly with a positioning member for securely mounting a device to a supporting member of the device assembly.

2. General Background

Often, a device such as an electronic device is connected to another device to provide a new function. For example, an adapter connected to an Internet protocol phone can enhance or extend one or more of the functions of the Internet protocol phone.

Conventionally, the adapter is placed next to the Internet protocol phone, and connected to the Internet protocol phone with short connecting cables. Because the adapter is free, it is common occurrence for a user to inadvertently drag the adapter off a desktop or tabletop. Moreover, it is difficult to move the Internet protocol phone to a difficult location.

One previous approach to minimize dragging problem of the adapter is to secure the adapter to the Internet protocol phone with glue. However, it is difficult to detach the adapter from the Internet protocol phone later on when needed. In addition, the glue may stain or otherwise detract from the aesthetic appearance of the adapter and the Internet protocol phone.

Therefore, a heretofore unaddressed need exists in the industry to overcome the aforementioned deficiencies and inadequacies.

SUMMARY

In an exemplary embodiment, a device assembly comprises a device, a supporting member, and a positioning member. The device comprises a bottom wall. The supporting member comprises a main portion to support the device. The positioning member comprises a central portion attached to the main portion of the supporting member, and a pair of positioning arms attached to the bottom wall of the device.

The bottom wall of the device defines a plurality of holes and a pair of positioning grooves. Each positioning arm of the positioning member comprises a hook received in a corresponding hole, and a bending portion engaged in a corresponding positioning groove. The central portion of the positioning member comprises a beam and a pair of clamping portions. The supporting member comprises a plurality of rib portions, and a channel is defined between each two adjacent rib portions. The beam of the positioning member is disposed in one of the channels. The rib portions each define a pair of receiving grooves. The clamping portions of the positioning member are received in corresponding of the receiving grooves.

Other advantages and novel features will become more apparent from the following detailed description when taken in conjunction with the accompanying drawings, in which:

DETAILED DESCRIPTION OF THE EMBODIMENTS

Figure 1:
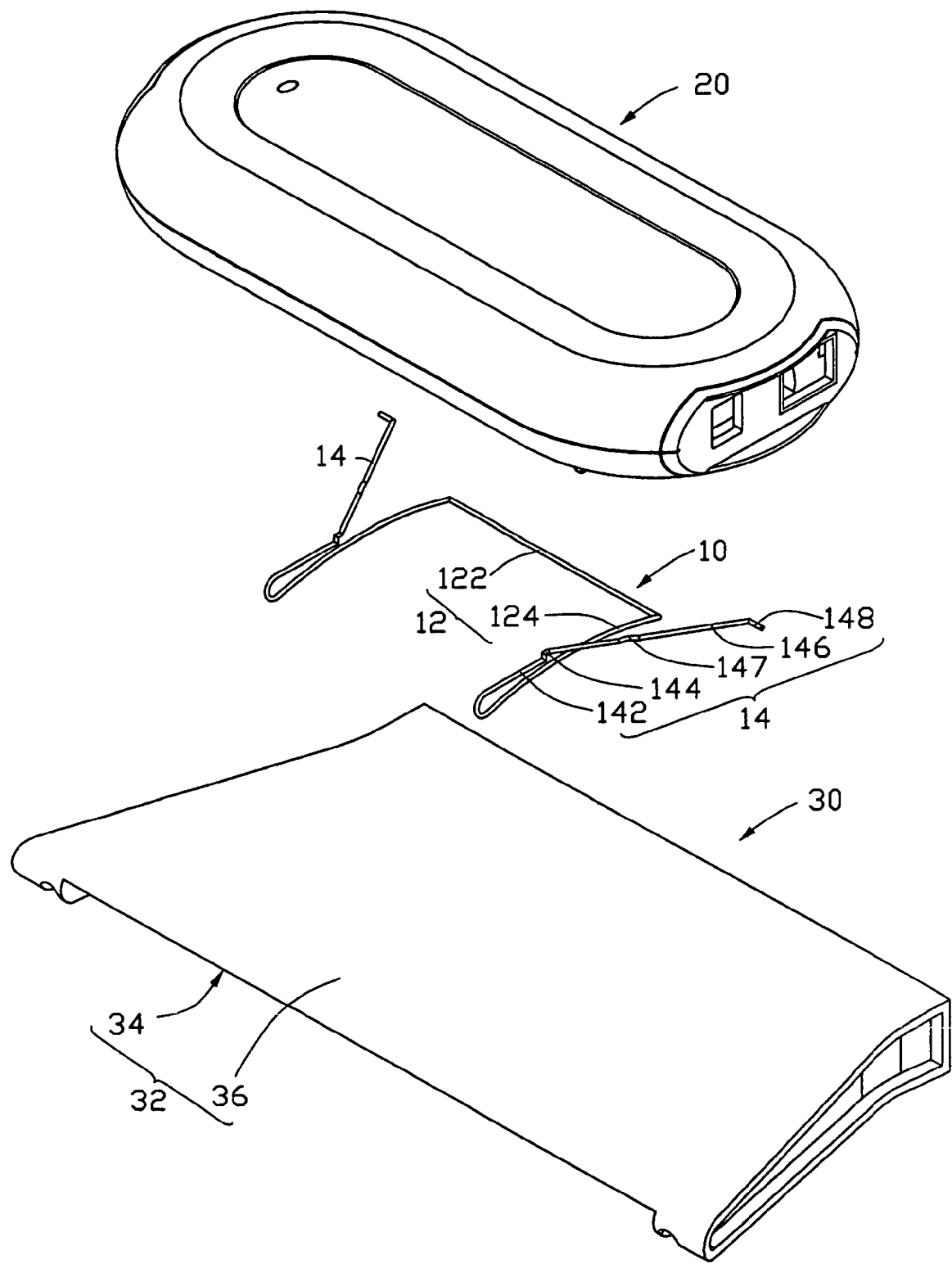
FIG. 1 is an exploded, isometric view of a device assembly in accordance with an exemplary embodiment of the present invention, the device assembly comprising a device, a positioning member, and a supporting member.

Referring to FIG. 1, a device assembly in accordance with the exemplary embodiment of the present invention comprises a positioning member 10, a device 20, and a supporting member 30.

The positioning member 10 is substantially flexible and symmetrical. The positioning member 10 comprises a central portion 12 and a pair of positioning arms 14. The positioning arms 14 extend from opposite ends of the central portion 12 respectively. The central portion 12 is substantially U-shaped. The central portion 12 comprises a central beam 122, and a pair of clamping portions 124 extending from opposite ends of the beam 122 respectively. Each positioning arm 14 comprises a connecting portion 142 adjacent to the clamping portion 124, a V-shaped bending portion 144, and a positioning portion 146. The bending portion 144 is between the connecting portion 142 and the positioning portion 146. The positioning portion 146 comprises a curved portion 147 located at a main part thereof, and a hook 148 disposed at a distal end thereof. When the positioning member 10 is attached to the device 20, the curved portion 147 abuts against the device 20.

Figure 2:
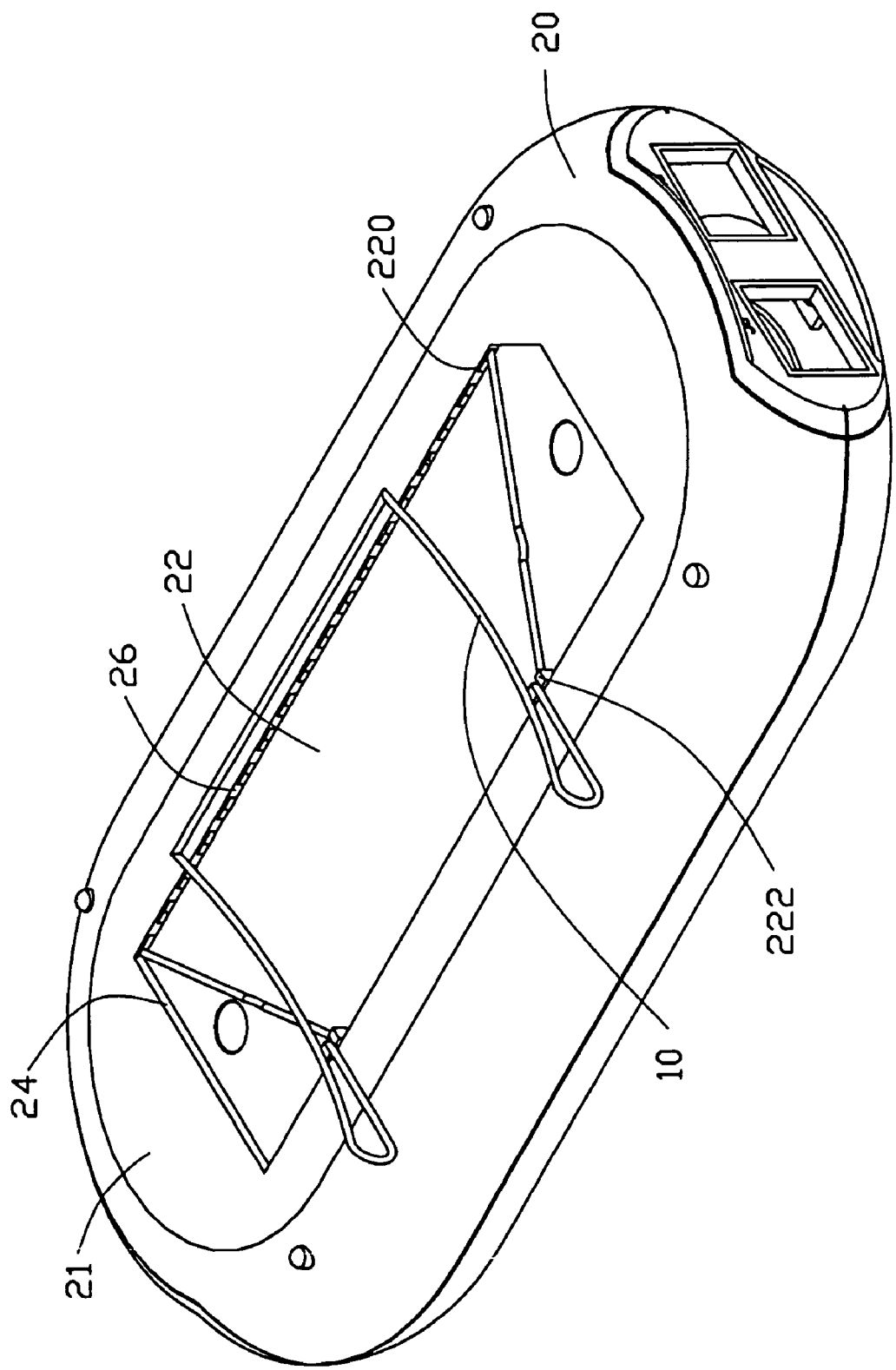
FIG. 2 is an isometric, assembled view of the device and the positioning member of FIG. 1, but viewed from another aspect.
Figure 3:
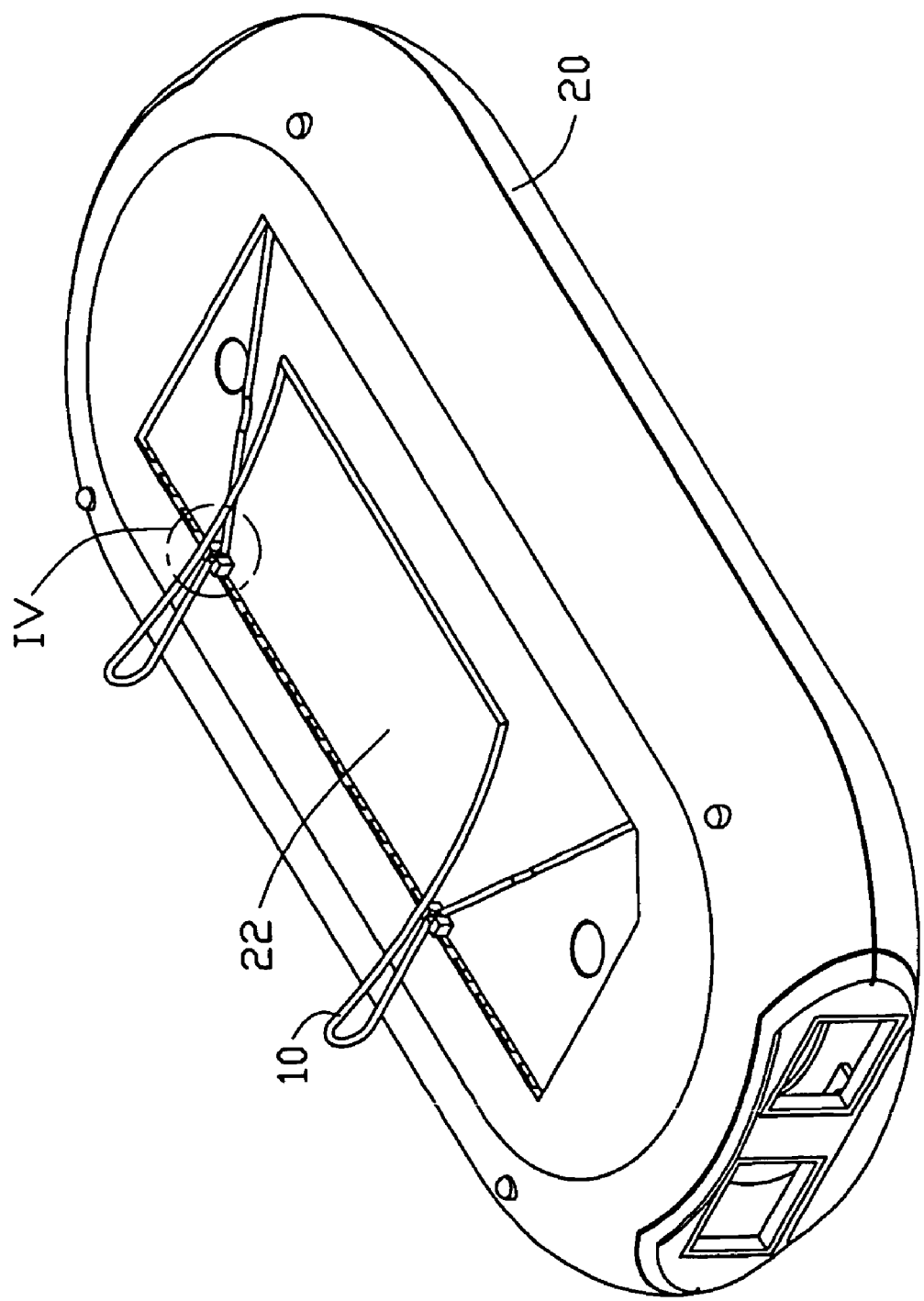
FIG. 3 is similar to of FIG. 2, but viewed from another aspect.
Figure 4:
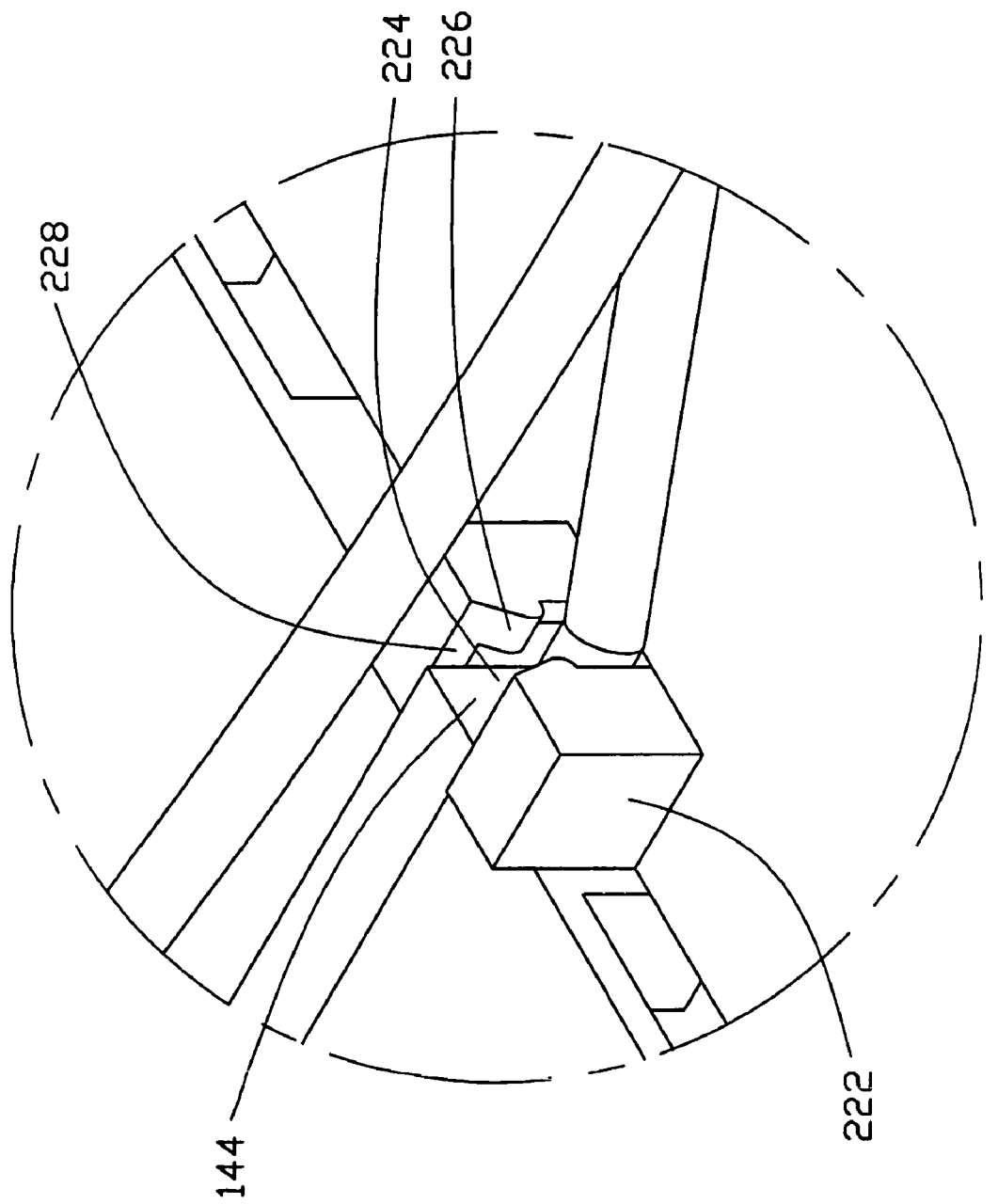
FIG. 4 is an enlarged view of a circle portion IV of FIG. 3.
Figure 5:
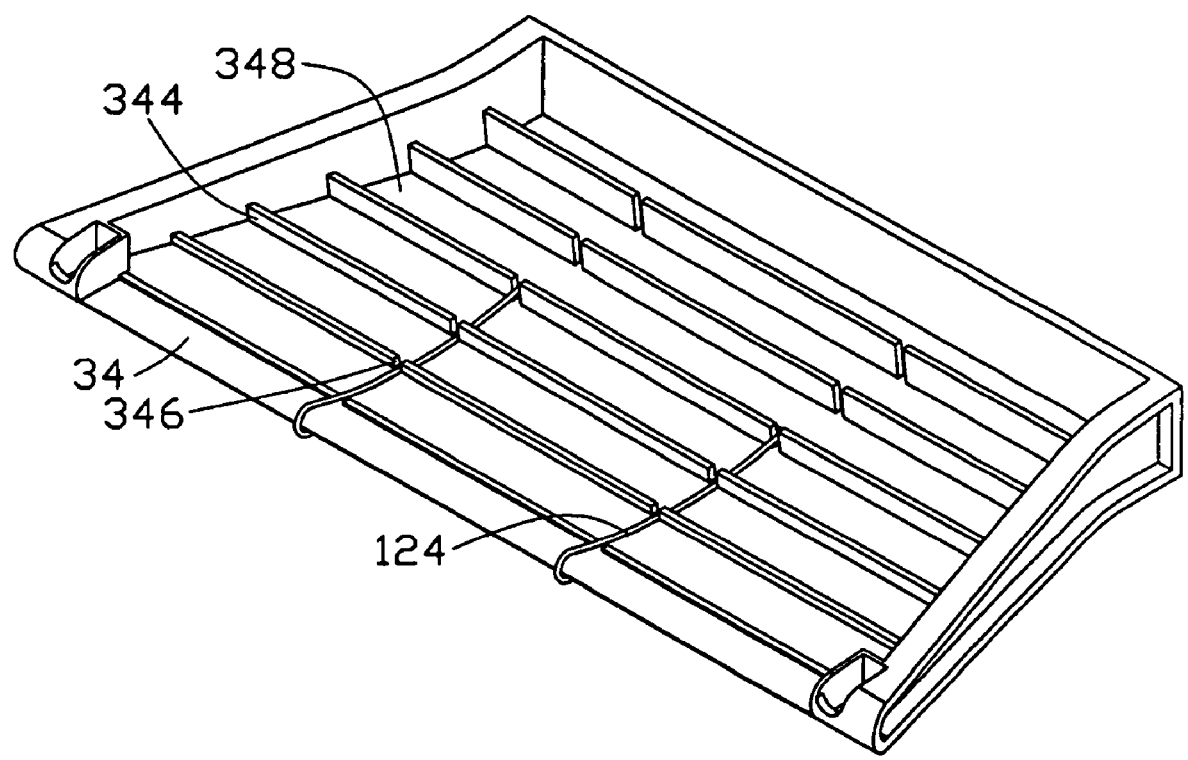
FIG. 5 is an isometric, inverted, assembled view of the supporting member and the positioning member of FIG. 1.
Figure 6:
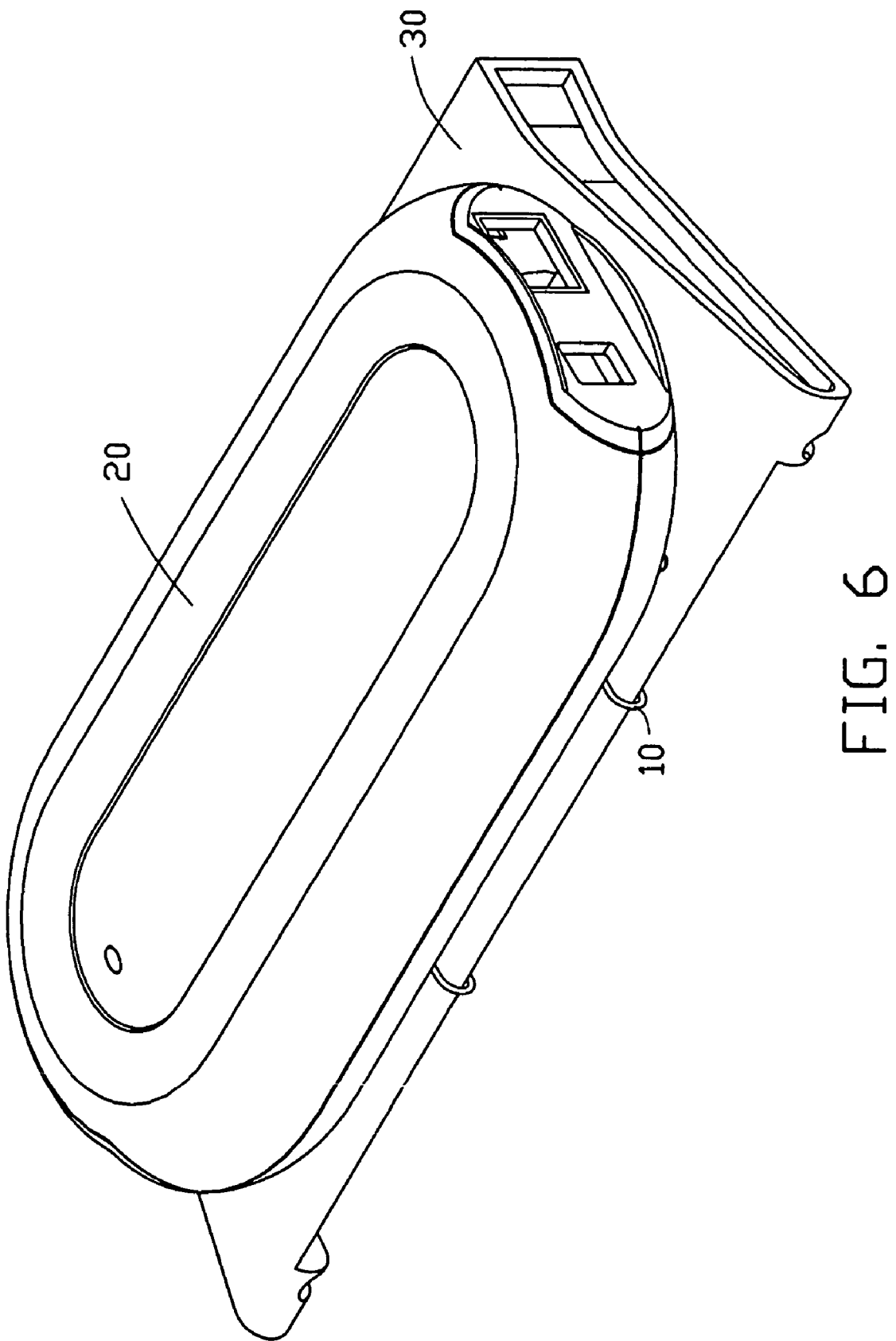
FIG. 6 is an assembled view of FIG. 1.

Referring also FIGS. 2-4, the device 20, such as an adapter, comprises a bottom wall 21. A recess 22 is defined in a middle of the bottom wall 21. The recess 22 is surrounded by a pair of opposite first sidewalls 24 and a pair of opposite second sidewalls 26. A length of each second sidewall 26 is greater than that of each first sidewall 24. A plurality of holes 220 is defined in the second sidewalls 26. The device 20 further comprises a pair of receiving portions 222 protruding from a portion of the recess 22 and located adjacent to one of the second sidewalls 26. A distance between the receiving portions 222 is generally equal to a distance between the bending portions 144 of the positioning member 10. A positioning groove 224 is defined in a middle of each receiving portion 222. A pair of walls 228 bounds opposite sides of the positioning groove 224 respectively. Each receiving portion 222 comprises a pair of protrusions 226 protruding from the walls 228 respectively into the positioning groove 224, for preventing the corresponding bending portion 144 from disengaging from the positioning groove 224.

The supporting member 30 comprises a main portion 32 to support the device 20. The main portion 32 comprises a bottom first surface 34, a sloping top second surface 36 opposite to the first surface 34, and a plurality of rib portions 344 protruding from the first surface 34 for reinforcing the supporting member 30. A channel 348 is defined between every two adjacent rib portions 344. Each rib portion 344 defines a pair of receiving grooves 346. A distance between the receiving grooves 346 is generally equal to a distance between the clamping portions 124.

Referring to FIGS. 1-6, in assembly, the hooks 148 of the positioning member 10 are received in the corresponding holes 220 of the device 20. The bending portions 144 of the positioning member 10 are received in the corresponding positioning grooves 224 of the device 20. The central portion 12 of the positioning member 10 is mounted to the first surface 34 of the supporting member 30, and the bottom wall 22 of the device 20 abuts against the second surface of the supporting member 30 such that the device 20 is mounted on the supporting member 30. In this position, the clamping portions 124 of the positioning member 10 are received in two or more of the receiving grooves 346 of the supporting member 30, and the beam 122 of the positioning member 10 is received in one of the channels 348 and abuts against a corresponding one of the rib portions 344 of the supporting member 30.

With the use of the rib portions 344, the central portion 12 of the positioning member 10 is stably retained in the supporting member 30. Thus, the device 20 and the positioning member 10 do not slide out of the supporting member 30.

The bending portions 144 of the positioning member 10 cannot be accidentally pulled out of the positioning grooves 224 of the device 20 during operation or transportation, since the bending portions 144 are constrained by the protrusions 226. Thus the device 20 does not easily slide out of the supporting member 30, and the device 20 is protected from accidental displacement and damage.

The holes 220 of the device 20 not only receive the hooks 148 of the positioning member 10, but also dissipate any heat generated by the device 20.

To assemble or disassemble the device assembly using the positioning member 10 is simple for a user. In mass manufacture, a process of assembly (or disassembly) does not necessarily require a professional operator, and thus production costs may be reduced.

In alternative embodiments, the supporting member 30 can be a portion of another device, such as an Internet protocol phone.

While exemplary embodiments have been described above, it should be understood that they have been presented by way of example only and not by way of limitation. Thus the breadth and scope of the present invention should not be limited by the above-described exemplary embodiments, but should be defined only in accordance with the following claims and their equivalents.

I claim:

1. A device assembly, comprising:
   a device comprising a bottom wall and a recess defined in the bottom wall, the bottom wall comprising a plurality of holes, a pair of positioning grooves, a pair of first sidewalls, and a pair of second sidewalls, wherein the pair of first sidewalls and the pair of second sidewalls surround the recess;
   a supporting member comprising a main portion to support the device; and
   a positioning member comprising a central portion and a pair of positioning arms extending from the central portion, the central portion being attached to the main portion of the supporting member, and the positioning arms being attached at the bottom wall of the device;
   wherein each of the pair of positioning arms comprises a hook received in a corresponding one of the holes, and a bending portion engaged in a corresponding one of the positioning grooves.

2. The device assembly as claimed in claim 1, wherein the bottom wall of the device comprises a pair of receiving portions protruding from a portion of the recess and located adjacent to one of the second sidewalls, and the positioning grooves are defined in the receiving portions.

3. The device assembly as claimed in claim 2, wherein the positioning groove of each receiving portion is bounded by a pair of walls, and each receiving portion comprises a pair of protrusions protruding from the walls into the positioning groove.

4. The device assembly as claimed in claim 1, wherein the central portion of the positioning member comprises a beam, and a pair of clamping portions extending from opposite ends of the beam.

5. The device assembly as claimed in claim 4, wherein the main portion of the supporting portion comprises a first surface and a plurality of rib portions protruding from the first surface, every two adjacent rib portions defines a channel therebetween, and the beam of the positioning member is disposed in one of the channels.

6. The device assembly as claimed in claim 5, wherein each rib portion comprises a pair of receiving grooves, and the clamping portions are disposed in the receiving grooves.

7. The device assembly as claimed in claim 4, wherein the positioning arm of each positioning member further comprises a connecting portion and a positioning portion, and the connecting portion is adjacent to the corresponding clamping portion.

8. The device assembly as claimed in claim 7, wherein the positioning portion comprises a curved portion located at a main part of the positioning portion, and the hook is located at a distal end of the positioning portion.

9. The device assembly as claimed in claim 1, wherein the holes are defined in each of the second sidewalls.

10. The device assembly as claimed in claim 1, wherein the bending portion is substantially V-shaped.

11. A device assembly, comprising:
    a device comprising a bottom wall comprising a plurality of holes;
    a supporting member comprising a main portion to support the device, the main portion comprising a first surface and a plurality of rib portions protruding from the first surface, wherein every two adjacent rib portions defines a channel therebetween; and
    a positioning member comprising a central portion and a pair of positioning arms extending from the central portion, each of the pair of positioning arms comprising a hook received in a corresponding one of the plurality of holes, wherein the central portion of the positioning member comprises a beam disposed in one of the channels, and a pair of clamping portions extending from opposite ends of the beam;
    wherein each of the plurality of rib portions comprises a pair of receiving grooves, and the clamping portions are disposed in the receiving grooves.

12. The device assembly as claimed in claim 11, wherein the bottom wall of the device comprises a pair of positioning grooves, and each positioning arm comprises a bending portion engaged in a corresponding one of the positioning grooves.

13. The device assembly as claimed in claim 12, wherein the bending portion is substantially V-shaped.

14. The device assembly as claimed in claim 12, wherein the device comprises a recess defined in the bottom wall, and the bottom wall comprises a pair of first sidewalls and a pair of second sidewalls surrounding the recess.

15. The device assembly as claimed in claim 14, wherein the holes are defined in each of the second sidewalls.

16. The device assembly as claimed in claim 14, wherein the bottom wall of the device comprises a pair of receiving portions protruding from a portion of the recess and located adjacent to one of the second sidewalls, and the positioning grooves are defined in the receiving portions.

17. The device assembly as claimed in claim 16, wherein the positioning groove of each receiving portion is bounded by a pair of walls, and each receiving portion comprises a pair of protrusions protruding from the walls into the positioning groove.

18. The device assembly as claimed in claim 11, wherein the positioning arm of each positioning member further comprises a connecting portion adjacent to a corresponding clamping portion, and a positioning portion.

19. The device assembly as claimed in claim 18, wherein the positioning portion comprises a curved portion located at a main part of the positioning portion, and the hook is located at a distal end of the positioning portion.

* * * * *

UNITED STATES PATENT AND TRADEMARK OFFICE
CERTIFICATE OF CORRECTION

PATENT NO.        : 7,641,166 B2                              Page 1 of 1
APPLICATION NO.   : 11/317272
DATED             : January 5, 2010
INVENTOR(S)       : Jiunn-Her Li It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1047 days.

Signed and Sealed this

Sixteenth Day of November, 2010

David J. Kappos
*Director of the United States Patent and Trademark Office*